J. W. FELL.
MILK COOLING DEVICE.
APPLICATION FILED SEPT. 11, 1912.
1,059,854.
Patented Apr. 22, 1913.
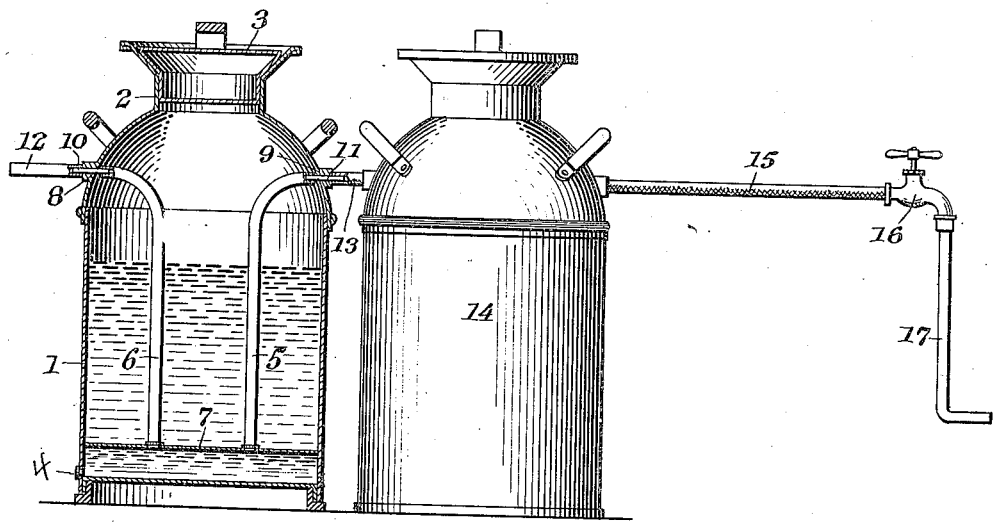
Witnesses
Inventor
J. W. Fell
By Victor J. Evans
Attorney

UNITED STATES PATENT OFFICE.

JOHN WRIGHT FELL, OF FORTUNA, CALIFORNIA.

MILK-COOLING DEVICE.

1,059,854.  Specification of Letters Patent.  Patented Apr. 22, 1913.

Application filed September 11, 1912.  Serial No. 719,780.

*To all whom it may concern:*

Be it known that I, JOHN WRIGHT FELL, a citizen of the United States, residing at Fortuna, in the county of Humboldt and State of California, have invented new and useful Improvements in Milk-Cooling Devices, of which the following is a specification.

This invention relates to milk coolers, the object in view being to provide a simple, economical, and effective contrivance for cooling milk in the can, preparatory to shipment of the same, thus rendering it unnecessary to transfer the milk from one receptacle to another.

With the above and other objects in view, the invention consists in the construction, combination and arrangement of parts, as will be hereinafter more fully described, illustrated in the accompanying drawings, and pointed out in the claim hereunto appended.

The accompanying drawing represents a side elevation, partly in section, showing two cans placed side by side and illustrating the cooling device of this invention applied thereto, one of the cans being shown in elevation, and the other in section.

Referring to the drawings, 1 designates a milk can, such as is commonly employed for shipping milk, the same being provided with the usual neck 2, and stopper 3.

In carrying out the present invention, I provide a cooling pipe which is made in sections to provide a downwardly extending run 5, and an upwardly extending run 6, these two runs passing through a false bottom 7, located sufficiently above the bottom of the can to form a water cooling chamber provided with an outlet stopper 4.

Under the arrangement illustrated, the upper ends of the runs 5 and 6 of the cooling pipe are passed through openings at the points 8 and 9 in the shoulder of the can, and also equipped with outwardly extending nipples 10 and 11, a discharge nozzle 12 being shown applied to the nipple 10, while a connector hose section 13 is applied to the nipple 11, and shown extending from the can 1 to an adjacently located can 14 constructed in the same manner as the can 1, hereinabove described. From the second or last can, a flexible hose 15 is shown as leading to a faucet 16 connected to a water service pipe 17.

The construction hereinabove described enables cold water to be passed through each of a series of cans, and after passing through all of the cans, the water is discharged into a suitable receptacle and carried off. In this way, the milk is cooled after being placed in the final receptacle or can provided for that purpose.

By means of the device hereinabove described, the animal heat is extracted from the milk in a very short time, after pouring the same into the can. Furthermore, the milk is not exposed in any way to germs or other impurities, as it is kept in a closed can, and the water does not come into contact therewith. The cooling device is also very economical, thoroughly sanitary, and the cooling process may be started and carried out with any quantity of milk.

What is claimed is:

The combination with a milk can, of a cooling device integral therewith embodying a false bottom fixedly secured in the can above the usual bottom thereof, and a cooling pipe comprising upward and downward runs terminally connected at their lower ends to the false bottom and communicating with the space under the same and fastened at their upper ends to the opposite sides of the can through which they pass.

In testimony whereof I affix my signature in presence of two witnesses.

JOHN WRIGHT FELL.

Witnesses:
MYRTLE HARRIS,
JOHN H. GAARDEN.